(12) United States Patent
Tanaka et al.

(10) Patent No.: US 7,904,116 B2
(45) Date of Patent: Mar. 8, 2011

(54) CALIBRATION METHOD, AND BASE STATION APPARATUS, TERMINAL APPARATUS AND RADIO APPARATUS UTILIZING THE SAME

(75) Inventors: Yasuhiro Tanaka, Aichi (JP); Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 992 days.

(21) Appl. No.: 11/353,140

(22) Filed: Feb. 14, 2006

(65) Prior Publication Data

US 2006/0183504 A1 Aug. 17, 2006

(30) Foreign Application Priority Data

Feb. 15, 2005 (JP) .................................. 2005-038265

(51) Int. Cl.
*H04M 1/00* (2006.01)
*H04B 1/38* (2006.01)
(52) U.S. Cl. ...................................... 455/561; 455/562.1
(58) Field of Classification Search ................ 455/562.1, 455/561
See application file for complete search history.

(56) References Cited

U.S. PATENT DOCUMENTS

| 6,954,444 | B2 * | 10/2005 | Ji et al. ........................... 370/331 |
| 2004/0204103 | A1 * | 10/2004 | Rouphael .................... 455/562.1 |
| 2005/0163244 | A1 * | 7/2005 | Seto et al. ...................... 375/267 |
| 2007/0060183 | A1 * | 3/2007 | Moulsley et al. ............. 455/522 |

FOREIGN PATENT DOCUMENTS

JP 2004-343468 12/2004
WO WO 2004/038988 5/2004

OTHER PUBLICATIONS

Sinem Coleri, et al., "Channel Estimation Techniques Based on Pilot Arrangement in OFDM Systems," IEEE Transactions on Broadcasting, Sep. 2002, pp. 223-229, vol. 48, No. 3, IEEE.
Jian Liu, et al., "OFDM-MIMO WLAN AP Front-end Gain and Phase Mismatch Calibration", Radio and Wireless Conference, 2004 IEEE, 2004, 09. 22, p. 151-154.
International Search Report dated Apr. 25, 2006 with English translation.

* cited by examiner

*Primary Examiner* — Duc Nguyen
*Assistant Examiner* — Ankur Jain
(74) *Attorney, Agent, or Firm* — McDermott Will & Emery LLP

(57) ABSTRACT

An examining unit examines the radio wave environments on at least one of a plurality of frequency channels usable in communications. Based on a result of examination by the examining unit, a selector selects a frequency channel to be used for communications. While using the channel selected by the selector, an execution unit transmits signals from a plurality of antennas to a terminal apparatus and performs calibration on the plurality of antennas by receiving signals from the terminal apparatus via the plurality of antennas.

9 Claims, 9 Drawing Sheets

FIG.3A

| LegacySTS | LegacyLTS | Legacy SIGNAL | MIMO SIGNAL | 1ST MIMO-STS | 1ST MIMO-LTS | 1ST DATA |

| | | | | 2ND MIMO-STS | 2ND MIMO-LTS | 2ND DATA |

FIG.3B

| LegacySTS | LegacyLTS | Legacy SIGNAL | MIMO SIGNAL | 1ST MIMO-STS | 1ST MIMO-LTS | 1ST DATA |

| | | | | 2ND MIMO-STS | 2ND MIMO-LTS | 2ND DATA |

| | | | | 3RD MIMO-STS | 3RD MIMO-LTS | |

| | | | | 4TH MIMO-STS | 4TH MIMO-LTS | |

70

CALIBRATION METHOD, AND BASE STATION APPARATUS, TERMINAL APPARATUS AND RADIO APPARATUS UTILIZING THE SAME

BACKGROUND OF THE INVENTION

1. Field of the Invention

The present invention relates to calibration technologies and it particularly relates to a calibration method for correcting the mismatch in a plurality of antennas and also particularly relates to a base station apparatus, a terminal apparatus and a radio apparatus utilizing the same.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been used in the wireless LAN (Local Area Network) standards such as IEEE802.11a/g and HIPERLAN/2. The burst signals in such a wireless LAN are generally subject to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carriers in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the amplitude and phase of signals transmitted from and received by a plurality of antennas, respectively, are so controlled as to form a directional pattern of the antenna. Hereinafter, such a directivity pattern will be referred to as "adaptive pattern". One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a channel corresponding to each of the plurality of antennas is set. That is, channels up to the maximum number of antennas are set for the communications between the transmitting apparatus and the receiving apparatus so as to improve the data transmission rates. Moreover, combining this MIMO system with a technique such as the OFDM modulation scheme results in a higher data transmission rate.

The combination of antenna directivity patterns in a transmitting apparatus and a receiving apparatus in the MIMO system may be expressed as follows, for example. One case is that the antenna of the transmitting apparatus has an omni pattern whereas the antenna of the receiving apparatus has an adaptive pattern. Another case is that both the antenna of the transmitting apparatus and the antenna of the receiving apparatus have adaptive patterns. The system can be more simplified if the former is used whereas the antenna directivity pattern is controlled in a more detailed manner in the latter and therefore the characteristics thereof can be improved. Since in the latter case the transmitting apparatus carries out adaptive array signal processing for transmission, known signals for use with channel estimation are provided beforehand from the receiving apparatus. To improve the accuracy in the control of adaptive array antennas, the transmitting apparatus shall acquire the channel characteristics corresponding to all the combinations between a plurality of antennas included in the transmitting apparatus and a plurality of antennas included in the receiving apparatus. Accordingly, the receiving apparatus transmits from all of its antennas the known signals for use with channel estimation. Hereinbelow, the known signals for channel estimation transmitted from a plurality of antennas will be referred to as "training signals", regardless of the number of antennas to be used for data communications.

Under these circumstances, the inventors of the present invention have come to recognize a problem as described below. If a radio apparatus including a transmitting apparatus therein performs adaptive array signal processing and consequently the mismatch between an analog circuit for transmission and an analog circuit for receiving (hereinafter referred to as "mismatch") differs for each antenna, the directivity pattern at the time of transmission will differ from a desired pattern. That is, although the radio apparatus calculates, based on the received signals, the weights to form the transmission directivity pattern, a directivity pattern which is not the directivity pattern to be realized by the weights is realized due to the mismatch that differs per antenna. Thus, the calibration for a plurality of antennas needs to be conducted. Since the error contained in a calibration result leads to the deterioration of communication quality, the error contained in the calibration result needs to be reduced. Also, it is desired to execute a calibration when the radio apparatus is activated or the frequency to be used for communications is changed.

SUMMARY OF THE INVENTION

The present invention has been made in view of the foregoing circumstances and an objective thereof is to provide a calibration technique which reduces errors contained in a calibration result.

In order to solve the above problems, a base station apparatus according to a preferred embodiment of the present invention comprises: an examining unit which examines a radio wave environment on at least one of a plurality of frequency channels usable for communications; a selector which selects one frequency channel to be used for communications, based on an examination result by the examining unit; and an execution unit which transmits signals from a plurality of antennas to a terminal apparatus using the one frequency channel selected by the selector and which performs calibration on the plurality of antennas by receiving signals from the terminal apparatus by the plurality of antennas.

According to this embodiment, the calibration is performed using one frequency channel selected from a result of search on the propagation environment. Hence, a frequency channel suitable for calibration can be selected from among a plurality of frequency channels and the errors contained in the calibration result can be reduced.

The base station apparatus may further comprise a receiver which receives signals from a plurality of terminal apparatuses. Based on the signals received by the receiver, the execution unit may select from the plurality of terminal apparatuses a terminal apparatus usable for calibration. "Based on the signals received by the receiver" may also mean "based on information contained in the received signals". For instance, a terminal apparatus which shall be used for calibration may be determined according to capability bits contained in the received signal. In such a case, a terminal apparatus usable for calibration is selected from among a plurality of receiving apparatuses, so that a terminal apparatus suitable for calibration can be selected and the errors contained in the calibration result can be reduced.

The execution unit may derive the quality of signals received by the receiver and may utilize the derived quality for selecting the terminal apparatus. The "quality" includes SINR (Signal-to-Interference-plus-Noise Ratio) and EVM (Error Vector Magnitude). In such a case, a terminal apparatus whose signals are of high quality is selected, so that the error contained in the calibration result can be reduced.

The base station apparatus may further comprise a storage unit which stores a result of calibration, executed in the execution unit, in the one frequency channel selected by the selector. In this case, it is only necessary to store a calibration result in a single frequency channel, so that the storage capacity can be made smaller.

The base station apparatus may further comprise a storage unit which stores, in an associated manner, a result of calibration, executed in the execution unit, in the one frequency channel selected by the selector and a number to identify a frequency channel used for calibration, wherein at the time of execution of calibration the execution unit may refer to the result of calibration and the number to identify a frequency channel, which are stored in the storage unit. In such a case, the calibration result and the numbers to identify the frequency channels are stored. Thus, when the same frequency channel is used for calibration, a calibration result can be derived in a simplified manner by referring to the calibration results stored.

Another preferred embodiment of the present invention relates to a terminal apparatus. This apparatus comprises: a selector which selects a base station apparatus that uses any of a plurality of channels usable for communications; and an execution unit which transmits signals from a plurality of antennas to one base station apparatus selected by the selector and which performs calibration on the plurality of antennas by receiving signals from the selected base station apparatus by the plurality of antennas.

According to this embodiment, a base station apparatus that uses any of a plurality of frequency channels is selected, so that a calibration can be executed.

Still another preferred embodiment of the present invention relates to a radio apparatus. This apparatus comprises: a selector which selects, from a plurality of frequency channels usable for communications, one frequency channel to be used for communications; and an execution unit which transmits signals from a plurality of antennas to a predetermined radio apparatus using the one frequency channel selected by the selector and which performs calibration on the plurality of antennas by receiving signals from the predetermined radio apparatus by the plurality of antennas.

According to this embodiment, the calibration is executed after a single frequency channel to be used for communications has been selected from a plurality of frequency channels. Thus, a frequency channel suitable for calibration among the plurality of frequency channels can be selected and therefore the error contained in a calibration result can be reduced.

Still another preferred embodiment of the present invention relates also to a radio apparatus. This apparatus comprises: an examining unit which examines a radio wave environment on at least one of a plurality of frequency channels usable for communications; a selector which selects one frequency channel to be used for communications, based on an examination result by the examining unit; and an execution unit which transmits signals from a plurality of antennas to another radio apparatus using the one frequency channel selected by the selector and which performs calibration on the plurality of antennas by receiving signals from the another radio apparatus by the plurality of antennas.

According to this embodiment, the calibration is performed using one frequency channel selected from a result of the checking on the propagation environment. Hence, a frequency channel suitable for calibration can be selected from among a plurality of frequency channels and the errors contained in the calibration result can be reduced.

Still another preferred embodiment of the present invention relates to a calibration method. This method is characterized in that one frequency channel to be used for communications is selected from among a plurality of frequency channels usable for communications, signals are transmitted to a radio apparatus from a plurality of antennas using the selected frequency channel, and calibration is performed on the plurality of antennas by receiving signals from the radio apparatus by the plurality of antennas.

Still another preferred embodiment of the present invention relates also to a calibration method. This method comprises: selecting, from a plurality of frequency channels usable for communications, one frequency channel to be used for communications; and transmitting signals from a plurality of antennas to a predetermined radio apparatus using the one frequency channel selected by the selecting and performing calibration on the plurality of antennas by receiving signals from the predetermined radio apparatus by the plurality of antennas.

The calibration method may further comprise receiving signals from a plurality of radio apparatuses, wherein, based on the signals received by the receiving, the transmitting and performing calibration may be such that a radio apparatus usable for calibration is selected from the plurality of radio apparatuses. The transmitting and performing calibration may be such that a quality of signals received by the receiving is derived and the derived quality is utilized for selecting the radio apparatus. The calibration method may further comprise storing in a memory a result of calibration, executed in the transmitting and performing calibration, in the one frequency channel selected by the selecting. The calibration method may further comprise storing in a memory, in an associated manner, a result of calibration, executed in the transmitting and performing calibration, in the one frequency channel selected by the selecting and a number to identify a frequency channel used for calibration, wherein at the time of performing calibration the transmitting and performing calibration may be such that the result of calibration and the number to identify a frequency channel, which are stored in the memory, are referred to.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B show each a structure of burst format in the communication system of FIG. 2.

DETAILED DESCRIPTION OF THE INVENTION

Figure 1:
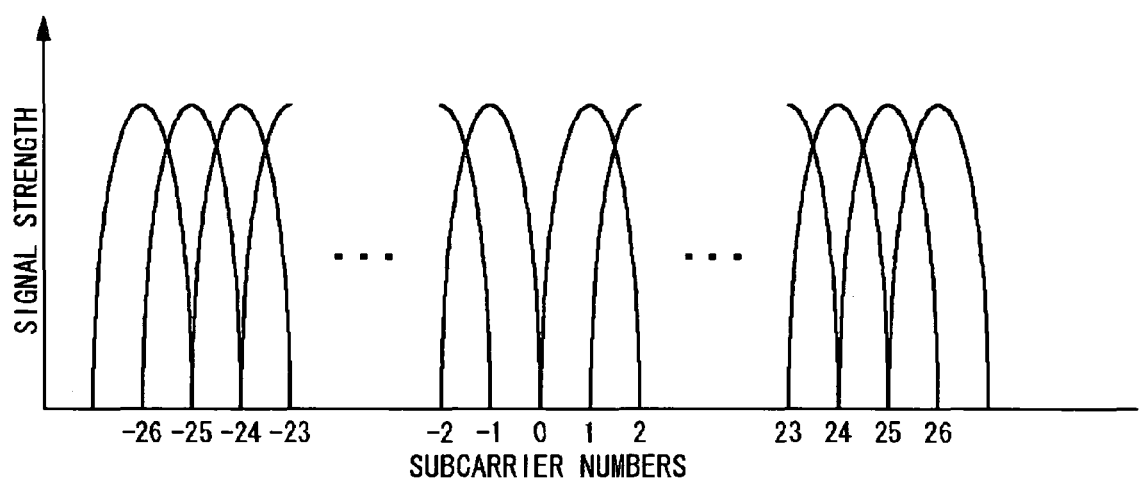
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

Before describing the present invention in a specific manner, an outline of the present invention will be described first. An embodiment of the present invention relates to a MIMO system comprised of a base station apparatus and a terminal apparatus. Both the base station apparatus and the terminal apparatus carry out adaptive array signal processing. A plurality of frequency channels are provided for the frequency band used by the MIMO system, and the base station apparatus selects one of the plurality of frequency channels. Since the base station apparatus and the terminal apparatus carry out the adaptive array signal processing even in the transmission of signals, a calibration is performed for the purpose of reducing the mismatches that differ for each of the antennas. As descried above, since the accuracy of adaptive array signal processing becomes lower as the error contained in a calibration result becomes larger, the communication quality may possibly deteriorate then. For this reason, calibration is performed in the present embodiments as will be explained hereinbelow. For the clarity of explanation in what is to follow, the calibration for a base station will be described herein.

The base station apparatus conducts a channel search, namely, measures the level of interference caused by other signals, for a plurality frequency channels. The base station apparatus selects a frequency channel having a smaller amount of interference. In order to have the terminal apparatus estimate the channel characteristics, the base station apparatus transmits training signals. The terminal apparatus estimates the channel characteristics corresponding respectively to the combinations between a plurality of antennas of the base station apparatus and a plurality of antennas of the terminal apparatus. Hereinafter, the channel characteristics corresponding respectively to the combinations as well as those channel characteristics expressed in the form of matrices or the like will be referred to as "channel characteristics" and no distinction will be made between these two. The channel characteristics estimated in the terminal apparatus correspond to those of a downlink.

In order to have the base station apparatus estimate the channel characteristics, the terminal apparatus transmits training signals. In so doing, the terminal apparatus transmits the channel characteristics as data. The base station apparatus estimates the channel characteristics corresponding respectively to the combinations between a plurality of antennas of the base station apparatus and a plurality of antennas of the terminal apparatus. These channel characteristics correspond to those of an uplink. The base station apparatus performs a calibration based on the channel characteristics of an uplink and the channel characteristics of a downlink so as to derive a difference of mismatch among a plurality of antennas. In this manner, the base station apparatus selects a frequency channel having less interference caused by the other signals, at the time of a calibration execution, so that according to the present embodiments the errors contained in a calibration result can be reduced. Though the calibration performed between the base station apparatus and the terminal apparatus will be described in the present embodiment, it may also be a calibration performed between the terminal apparatuses.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, each of the subcarriers is designated by a "subcarrier number". Similar to the IEEE802.11a standard, 53 subcarriers, namely, subcarrier numbers "−26" to "26" are defined herein. It is to be noted that the subcarrier number "0" is set to null so as to reduce the effect of a direct current component in a baseband signal. The respective subcarriers are modulated by a modulation scheme which is set variably.

Used here as a modulation scheme is any one of BPSK (Binary Phase-Shift Keying), QPSK (Quadrature Phase-Shift Keying), 16QAM (Quadrature Amplitude Modulation), 64QAM and 256QAM. Convolutional coding is applied, as an error correction scheme, to these signals. The coding rates for the convolutional coding are set to 1/2, 3/4 and so forth. The number of antennas used in a MIMO system is set variably. As a result, when the mode of modulation scheme and the values of coding rate and the number of antennas are set variably, the data rate is also set variably.

Figure 2:
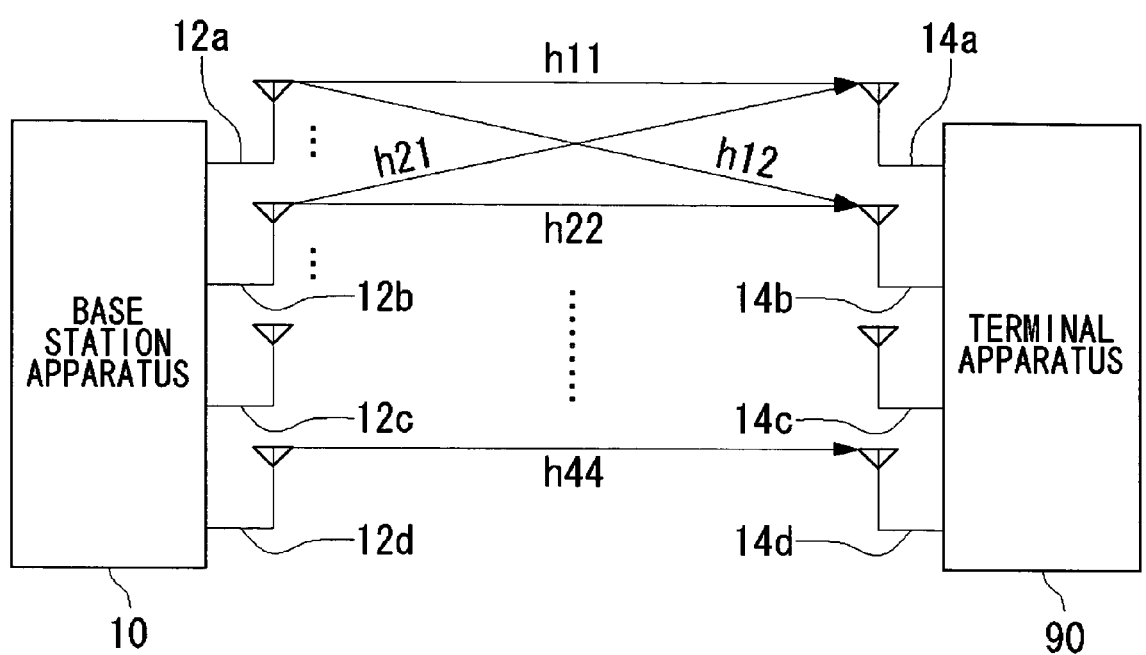
FIG. 2 illustrates a structure of a communication system according to an embodiment of the present invention.

FIG. 2 illustrates a structure of a communication system according to an embodiment of the present invention. A communication system 100 includes a base station apparatus 10 and a terminal apparatus 90. The base station apparatus 10 includes a first antenna 12*a*, a second antenna 12*b*, a third antenna 12*c* and a fourth antenna 12*d*, which are generically referred to as "antennas 12", and the terminal apparatus 90 includes a first antenna 14*a*, a second antenna 14*b*, a third antenna 14*c* and a fourth antenna 14*d*, which are generically referred to as "antennas 14". In a downlink, the base station apparatus 10 corresponds to a transmitting apparatus whereas a terminal apparatus 90 corresponds to a receiving apparatus. In an uplink, the correspondence will be opposite to the case of the downlink.

Before describing a structure of the communication system 100, an outline of a MIMO system will be explained first. Assume here in the description of the downlink that data are being transmitted from the base station apparatus 10 to the terminal apparatus 90. The base station apparatus 10 transmits different data from the first antenna 12*a* to fourth antenna 12*d*, respectively. As a result, the data rate becomes higher. The terminal apparatus 90 receives the data by the first antenna 14 to fourth antenna 14*d*. The terminal apparatus 90 demodulates independently the data transmitted from the first antenna 12*a* to fourth antenna 12*b* by using the adaptive array signal processing.

Since the number of antennas 12 is "4" and the number of antennas 14 is also "4", the number of combinations of channels between the antennas 12 and the antennas 14 is "16". The channel characteristic between from the ith antenna 12*i* to the jth antenna 14*j* is denoted by $h_{ij}$. In FIG. 2, the channel characteristic between the first antenna 12*a* and the first antenna 14*a* is denoted by $h_{11}$, that between the first antenna 12*a* and the second receiving antenna 14*b* by $h_{12}$, that between the second antenna 12*b* and the first antenna 14*a* by $h_{21}$, that between the second antenna 12*b* and the second antenna 14*b* by $h_{22}$, and that between the fourth antenna 12*d* and the fourth antenna 14*d* by $h_{44}$. For the clarity of illustration, it is omitted to show the other channels in FIG. 2.

The terminal apparatus 90 operates so that data transmitted from the first antenna 12*a* to the fourth antenna 12*d*, respectively, are demodulated independently by adaptive array signal processing. The base station apparatus 10 also performs adaptive array signal processing on the first antenna 12*a* to fourth antenna 12*d*. In this manner, the adaptive array signal processing is performed also at the transmitting side, namely, by the base station apparatus 10, so that the space division in a MIMO system is ensured. As a result, the interference among signals transmitted by a plurality of antennas 12 becomes smaller, so that the communication quality can be improved in the present embodiments. It is to be noted that the operations of the base station apparatus 10 and the terminal apparatus 90 may be reversed.

FIGS. 3A and 3B show each a structure of burst format in a communication system 100. FIG. 3A shows a burst format when the number of antennas 12 used is "2". The upper row of FIG. 3A shows a burst signal transmitted from the first antenna 12*a* whereas the lower row thereof shows a burst signal transmitted from the second antenna 12*b*. "Legacy STS (Short Training Sequence)", "Legacy LTS (Long Training Sequence)" and "Legacy SIGNAL" are signals compatible with a communication system, such as a wireless LAN system that conforms to the IEEE802.11a standard, which is not compatible with a MIMO.

"Legacy STS" is used for the setting of AGC (Automatic Gain Control), the timing synchronization and the like. "Legacy LTS" is used for the estimation of channel characteristics. "Legacy SIGNAL" contains control information. Signals assigned posterior to "MIMO SIGNAL" are those characteristic of and inherent to a MIMO system, and "MIMO SIGNAL" contains control information corresponding to a MIMO system. "First MIMO-STS" and the "Second MIMO-STS" are used for the setting of AGC, timing synchronization and the like, "First MIMO-LTS" and "Second MIMO-LTS" are used for the estimation of channel characteristics, and "First Data" and the "Second Data" are data to be transmitted.

Similar to FIG. 3A, FIG. 3B shows a burst format at the time when "two" antennas 12 are used for data transmission. However, the above-described training signals are added. In FIG. 3B, the training signals correspond to "First MIMO-LTS" through "Fourth MIMO-STS". "Third MIMO-STS" and "Fourth MIMO-LTS" are so added as to correspond to "Third MIMO-LTS" and "Fourth MIMO-LTS". Here, the "First MIMO-STS" through "Fourth MIMO-STS" and the "First MIMO-LTS" through "Fourth MIMO-LTS" are transmitted from the first antenna 12*a* to fourth antenna 12*d*. Hereinafter, the "First MIMO-STS" to "Fourth MIMO-STS" are generically referred to as "MIMO-STS" or "MIMO-STSs"; the "First MIMO-LTS" to "Fourth MIMO-LTS" are generically referred to as "MIMO-LTS" or "MIMO-LTSs"; and "First Data" and "Second Data" are generically referred to as "Data".

The burst format at the time when the training signals are sent is not limited to that of FIG. 3B For example, any of MIMO-LTSs may be so arranged as to have a different timing. The arrangement may be such that the MIMO-LTSs do not correspond to the four antennas 12. The "two" antennas may be so separated as to correspond to "4" antennas. The arrangement may be such that the MIMO-STSs are not necessarily transmitted from all of antennas 12 that transmit MIMO-LTSs. Moreover, the burst format may not be that of FIG. 3A or FIG. 3B, and it may be the burst format assigned prior processing to that of FIG. 3A or FIG. 3B. In such a case, it is only necessary to replace the aforementioned antennas 12 with "streams". When at least part of the burst format is multiplied by a steering matrix, a burst signal is turned into the formats that correspond to the increasing number of antennas 12. That is, it suffices if the training signals are transmitted from the antennas 12 with which to estimate the channel characteristics. That is, the "training signals" correspond to "MIMO-LTSs" having multiple streams the number of which is associated with the channel characteristics to be estimated, in order to have the terminal apparatus 90 estimate the channel characteristics, independently of the number of data to be transmitted.

The "First MIMO-STS" to "Fourth MIMO-STS" are structured by patterns such that the interference among them becomes small. The same holds true for the "First MIMO-LTS" to "Fourth MIMO-LTS". The explanation of these structures thereof is omitted here. Though it may be generally a case that "Legacy LTS", "First MIMO-LTS" and the like in FIG. 3A are called training signals, the aforementioned training signals as shown in FIG. 3B will be called the training signals in this patent specification.

Figure 4:
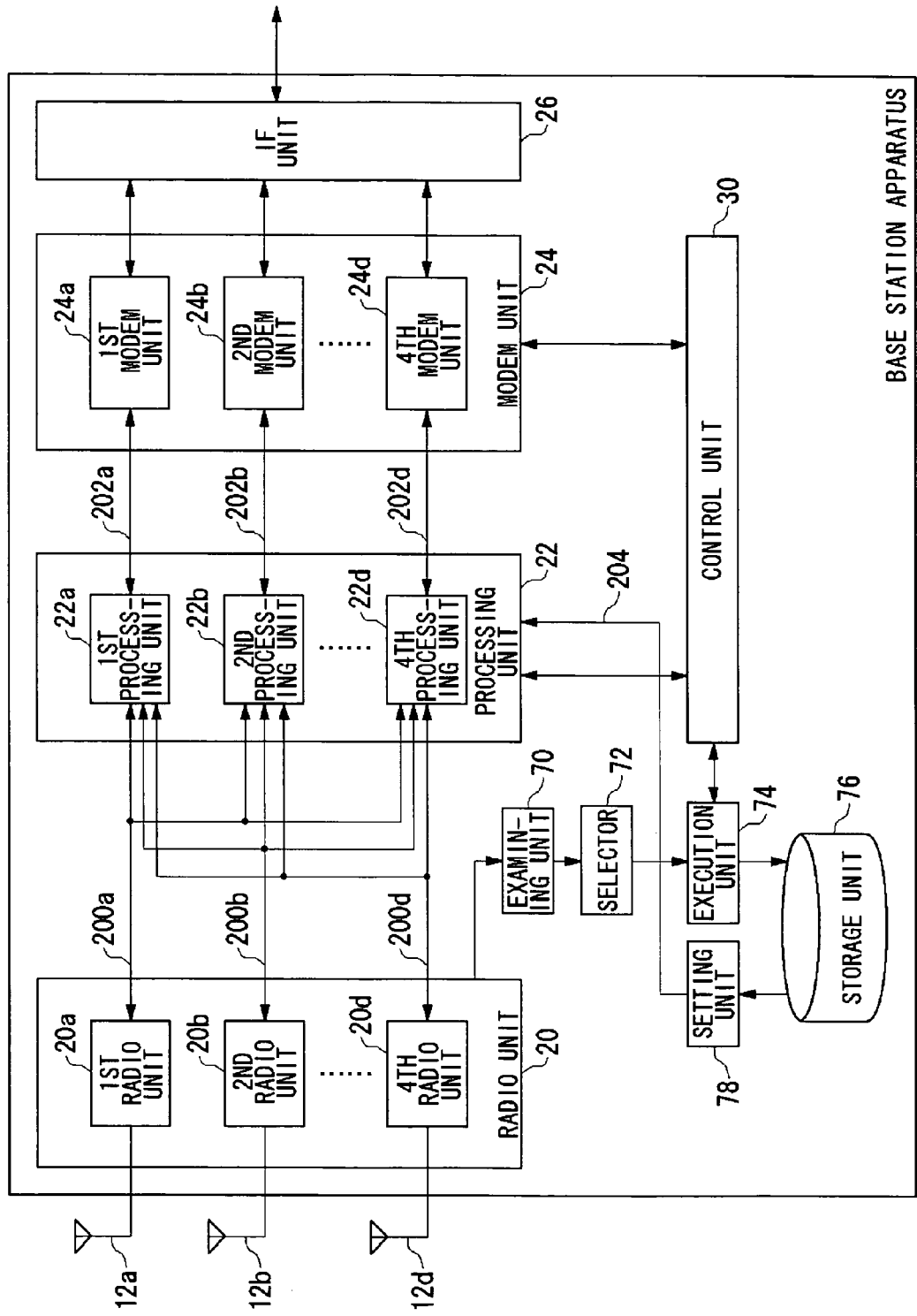
FIG. 4 illustrates a structure of the base station apparatus shown in FIG. 2.

FIG. 4 illustrates a structure of a base station apparatus 10. The base station apparatus 10 includes a first radio unit 20*a*, a second radio unit 20*b*, . . . and a fourth radio unit 20*d*, which are generically referred to as "radio unit 20", a first processing unit 22*a*, a second processing unit 22*b*, . . . and a fourth radio 22*d*, which are generically referred to as "processing unit 22", a first modem unit 24*a*, a second modem unit 24*b*, . . . and a fourth modem unit 24*d*, which are generically referred to as "modem unit 24", an IF unit 26, a control unit 30, an examining unit 70, a selector 72, an execution unit 74, a storage unit 76 and a setting unit 78. Signals involved include a first time-domain signal 200*a*, a second time-domain signal 200*b*, and a fourth time-domain signal 200*d*, which are generically referred to as "time-domain signal 200", a first frequency-domain signal 202*a*, a second frequency-domain signal 202*b*, and a fourth frequency-domain signal 202*d*, which are generically referred to as "frequency-domain signal 202" and a correction-value signal 204. The terminal apparatus 90 has a structure similar to that of the base station apparatus 10. In the following description, the transmitting operation corresponds to downlink communications and the receiving operation corresponds to uplink communications.

As a receiving operation, the radio unit 20 carries out frequency conversion of received radio-frequency signals received by the antennas 12 so as to derive baseband signals. The radio unit 20 outputs the baseband signals to the processing unit 22 as the time-domain signals 200. The baseband signal, which is composed of in-phase components and quadrature components, shall generally be transmitted by two signal lines. For the clarity of figure, the signal is presented here by a single signal line. An AGC unit and/or an A-D conversion unit are also included. As a transmission operation, the radio unit 20 carries out frequency conversion of baseband signals from the processing unit 22 so as to derive radio-frequency signals. Here, the baseband signal from the processing unit 22 is also indicated as the time-domain signal 200. The radio unit 20 outputs the radio-frequency signals to the antenna 12. A power amplifier and/or a D-A conversion unit are also included. It is assumed herein that the time-domain signal 200 is a multicarrier signal converted to the time domain and is a digital signal. Signals processed in the radio unit 20 form burst signals, and their formats are those as shown in FIGS. 3A and 3B.

As a receiving operation, the processing unit 22 converts a plurality of time-domain signals 200 respectively into the frequency domain and performs adaptive array signal processing on the thus converted frequency-domain signals. Then the processing unit 22 outputs the result of adaptive array signal processing as the frequency-domain signals 202. One frequency-domain signal 202 corresponds to a signal transmitted from one of the antennas 14 shown in FIG. 2. As a transmission operation, the processing unit 22 inputs, from the modem unit 24, the frequency-domain signal 202 serving as a frequency-domain signal, and then performs adaptive array signal processing on the frequency-domain signal. That is, beamforming is performed. The processing unit 22 corrects the signals that have undergone the adaptive array signal processing, by a correction-value signal 204 which will be discussed later.

The correction-value signal 204 has a different value for each of the antennas 12. Accordingly, the correction-value signals 204 include a first correction-value signal 204 to a fourth correction-value signal 204d (not shown) in such a manner as to correspond to the respective antennas 12. In FIG. 4, they are represented by one correction-value signal 204. The processing unit 22 converts the corrected signals into the time domain and outputs them as the time-domain domain signals 200. It is assumed here that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
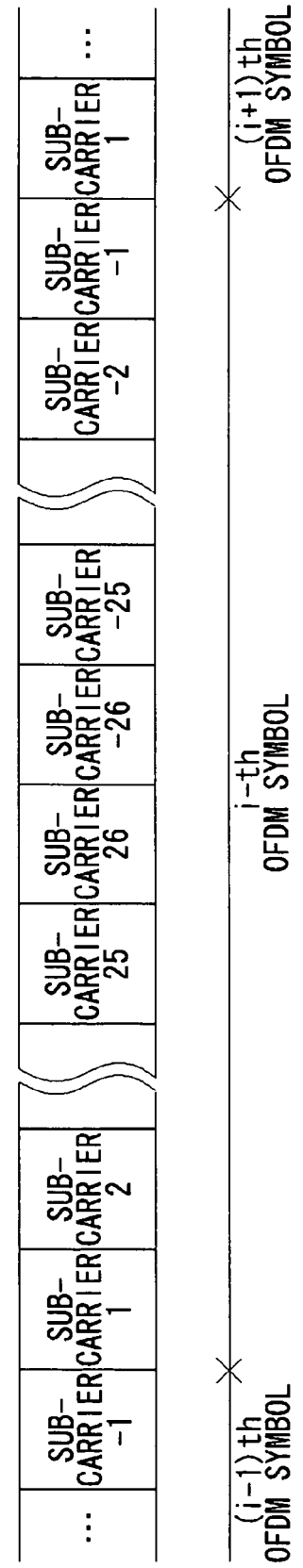
FIG. 5 illustrates a structure of the frequency-domain signal shown in FIG. 4.

FIG. 5 illustrates a structure of a frequency-domain signal. Assume herein that a combination of subcarrier numbers "−26" to "26" shown in FIG. 1 constitutes an "OFDM" symbol. An "i"th OFDM symbol is such that subcarrier numbers "1" to "26" and subcarrier numbers "−26" to "−1" are arranged in this order. Assume also that an "i−1"th OFDM symbol is placed immediately before the "i"th OFDM symbol, and an "i+1"th OFDM symbol is placed immediately after the "i"th OFDM symbol.

Referring back to FIG. 4, as a receiving processing, the modem unit 24 demodulates and decodes the frequency-domain signal 202 outputted from the processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the processing unit 22 as a frequency-domain signal 202. It is assumed that when the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to a plurality of modem units 24.

Figure 6:
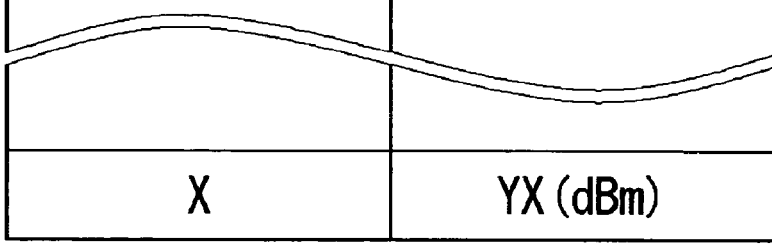
FIG. 6 illustrates a data structure obtained as a result of search conducted by an examining unit of FIG. 4.

The examining unit 70 checks the radio wave environment on at least one of a plurality of frequencies usable for communications. That is, the examining unit 70 conducts a channel search. In a MIMO system, a plurality of usable frequency channels are provided in advance. For each of the plurality of frequency channels, the examining unit 70 measures the strength of signals, for example, RSSI (Received Signal Strength Indicator) received by the radio unit 20. It is to be noted that the examining unit 70 may check on a propagation environment by use of signals from other than the radio unit 20. Since the base station apparatus 10 doe not execute a communication in a frequency channel where the measurement is under way, the measured strength of signals is equivalent to the strength of interference caused by the other communication apparatuses. The examining unit 70 conducts the aforementioned measurement on a plurality of frequency channels. FIG. 6 illustrates a data structure obtained as a result of search conducted by the examining unit 70. As shown in FIG. 6, the frequency channels of "1" through "X" are provided and in each frequency channel the signal strength is measured as in "Y1 (dBm)".

Now refer back to FIG. 4. The selector 72 selects one frequency channel to be used for communications, based on the search result by the examining unit 70. More specifically, the selector 72 selects, from the signal strengths for a plurality of frequency channels, a frequency channel whose signal strength is the minimum. Such a frequency channel selected is equivalent to a frequency channel where the strength of interference caused by other communication apparatuses is small. The selector 72 conveys information on the selected frequency channel to the execution unit 74 and also conveys the information to the control unit 30 via a signal line, not shown. The control unit 30 controls the radio unit 20 and so forth via a signal line (not shown) so that a communication is executed by the notified frequency channel. The operations by the examining unit 70 and selector 72 are conducted when the base station apparatus 10 itself is activated or the frequency channel currently in use is changed. The operation of the examining unit 70 and the operation of the selector 72 may be integrally conducted. That is, the examining unit 70 and selector 72 selects the signal strength in one frequency channel and compares the measured signal strength with a threshold value. If the signal strength is less than the threshold value, the examining unit 70 and selector 72 selects said frequency channel. In this case, the signal strengths of the remaining frequency channels will not be measured. Accordingly, the processing time is reduced. If the signal strength is not less than the threshold value, the examining unit 70 and selector 72 moves to the next frequency channel and then performs the similar operation.

The radio unit 20, processing unit 22 and modem unit 24 receive signals from a plurality of terminal apparatuses 90. The signal may be arbitrary and it may be a signal requesting a connection, for example. The base station apparatus 10 extracts an identification number, for example, a MAC address contained in the signal. The radio unit 20 measures the strength of the signal. In this manner, the identification numbers and the signal strength are associated with each other for each of a plurality of terminal apparatuses 90.

The execution unit 74 selects a terminal apparatus 90 suitable for the execution of calibration from a plurality of terminal apparatuses 90, based on the signal strengths for the plurality of terminal apparatuses 90. A terminal apparatus 90 whose strength of signals becomes maximum is selected here. The execution unit 74 may recognize beforehand a terminal apparatus 90 compatible with the calibration. As will be described later, the base station apparatus 10 transmits signals to and receives signals from the terminal apparatus 90, and performs calibration using the transmitted/received signals. Accordingly, the accuracy of calibration improves if the signal is large to an extent. While using a frequency channel selected by the selector 72, the execution unit 74 transmits signals to be transmitted from a plurality of antennas 12 to the terminal apparatus 90. Here, the signals which will be transmitted from the execution unit 74 correspond to the aforementioned training signals. The execution unit 74 receives the training signals sent from the terminal apparatus 90 and then performs calibration on a plurality of antennas 12.

Such a calibration operation will now be described. A method of calibration for the antennas 12 of the base station apparatus 10 will be explained here. The response at a transmitting side is expressed by the following Equation (1).

$$A(i)=\text{diag}(\alpha(i,1),\Lambda,\alpha(i,N)) \quad (1)$$

where $\alpha$ indicates a response component and there will be as many $\alpha$'s as the number of antennas 12. Though the number of antennas 12 is "4" in FIG. 4, it is abstracted to be "N" here. "i" identifies a specific apparatus and "1" corresponds to the base station apparatus 10 and "2" corresponds to the terminal apparatus 90. The response at a receiving side is expressed by the following Equation (2).

$$B(i)=\text{diag}(\beta(i,1),\Lambda,\beta(i,N)) \quad (2)$$

where $\beta$ indicates a response component and the rest is the same notation as that given in the transmitting side. For the clarity of explanation, it is assumed herein that the number of antennas is the same in the base station apparatus 10 and the terminal apparatus 90. A matrix of channel characteristics from the base station apparatus 10 to the terminal apparatus 90 is denoted by $H(1\rightarrow 2)$. Here, the matrix $H(1\rightarrow 2)$ has components corresponding to "(the number of antennas 12)×(the number of antennas 14)", and the values of each component are $h_{11}$ and the like as shown in FIG. 2. The general channel characteristics in which such characteristics and the responses at the transmitting and receiving sides are taken into account is expressed by the following Equation (3).

$$H'(1\rightarrow 2)=B(2)H(1\rightarrow 2)A(1) \quad (3)$$

If Equation (3) is expressed as components of matrices, we have the following Equation (4).

$$h'(1\rightarrow 2)(k_2k_1)=\beta(2,k_2)h(1\rightarrow 2)(k_2k_1)\alpha(1,k_1) \quad (4)$$

In Equation (4), $h'(1\rightarrow 2)(k_2k_1)$ corresponds to a general characteristic of a channel from the $k_1$-th antenna 12 of the base station apparatus 10 to $k_2$-th antenna 14 of the terminal apparatus 90. Such a matrix as this is derived by the terminal apparatus 90. In so doing, the training signals transmitted from the base station apparatus 10 are used. When transmitting the training signals to the base station apparatus 10, the terminal apparatus 90 transmits the values of the derived general channel characteristics as data. Accordingly, the execution unit 74 acquires the above data from the terminal apparatus 90. Based on the training signals transmitted by the terminal apparatus 90, the processing unit 22 derives a general characteristic of a channel from the $k_2$-th antenna 12 of the terminal apparatus 90 to $k_1$-th antenna 14 of the base station apparatus 10. As a result, the execution unit 74 also acquires such derived data. The examining unit 70 calculates a ratio of the general channel characteristic of downlink over that of uplink as follows.

$$\frac{h'(1\rightarrow 2)(k_2k_1)}{h'(2\rightarrow 1)(k_1k_2)} = \frac{\beta(2,k_2)h(1\rightarrow 2)(k_2k_1)\alpha(1,k_1)}{\beta(1,k_1)h(2\rightarrow 1)(k_1k_2)\alpha(2,k_2)} \quad (5)$$

$$= \frac{\beta(2,k_2)h(1\rightarrow 2)(k_2k_1)\alpha(1,k_1)}{\beta(1,k_1)h(1\rightarrow 2)(k_2k_1)\alpha(2,k_2)}$$

$$= \frac{\alpha(1,k_1)}{\beta(1,k_1)}\frac{\beta(2,k_2)}{\alpha(2,k_2)}$$

Assume now that $h'(1\rightarrow 2)(k_2k_1)$ and $h'(2\rightarrow 1)(k_1k_2)$ are equal to each other. Furthermore, if the antennas 12 of the base station apparatus 10 is fixed to the first antenna 12a, the following relationship expressed by Equation (6) holds.

$$\frac{h'(1\rightarrow 2)(k_21)}{h'(2\rightarrow 1)(1k_2)} = \frac{\alpha(1,1)}{\beta(1,1)}\frac{\beta(2,k_2)}{\alpha(2,k_2)} \quad (6)$$

A ratio of Equation (5) over (6) is:

$$\frac{\frac{\alpha(1,k_1)}{\beta(1,k_1)}}{\frac{\alpha(1,1)}{\beta(1,1)}} = \frac{\frac{h'(1\rightarrow 2)(k_2k_1)}{h'(2\rightarrow 1)(k_1k_2)}}{\frac{h'(1\rightarrow 2)(k_21)}{h'(2\rightarrow 1)(1k_2)}} \quad (7)$$

Such a ratio as Equation (7) indicates a difference of mismatch in among a plurality of antennas 12. That is, a difference of mismatch in the other antennas 12 against the first antenna 12a is derived, and the thus derived difference will serve as a correction value for each of the antennas 12. Note that the mismatch of the first antenna 12a against the first antenna 12a itself will be "1" since the denominator and the numerator are equal to each other.

The storage unit 76 stores the calibration results executed in the execution unit 74, namely, the correction values for the respective antennas 12. Since the calibration is performed on one frequency channel selected by the selector 72, the storage unit 76 has the storage capacity capable of storing correction values associated with one frequency channels.

The setting unit 78 outputs the correction values to the processing unit 22 as the correction-value signal 204. As described before, the correction-value signal has components of as many as the number of antennas 12. In FIG. 4, the correction-value signal has "4" components. As described before, the value of a component for the first antenna 12a is "1".

In terms of hardware, this structure can be realized by a CPU, a memory and other LSIs of an arbitrary computer. In terms of software, it is realized by memory-loaded programs which have communication functions or the like, but drawn and described herein are function blocks that are realized in cooperation with those. Thus, it is understood by those skilled in the art that these function blocks can be realized in a variety of forms such as by hardware only, software only or the combination thereof.

Figure 7:
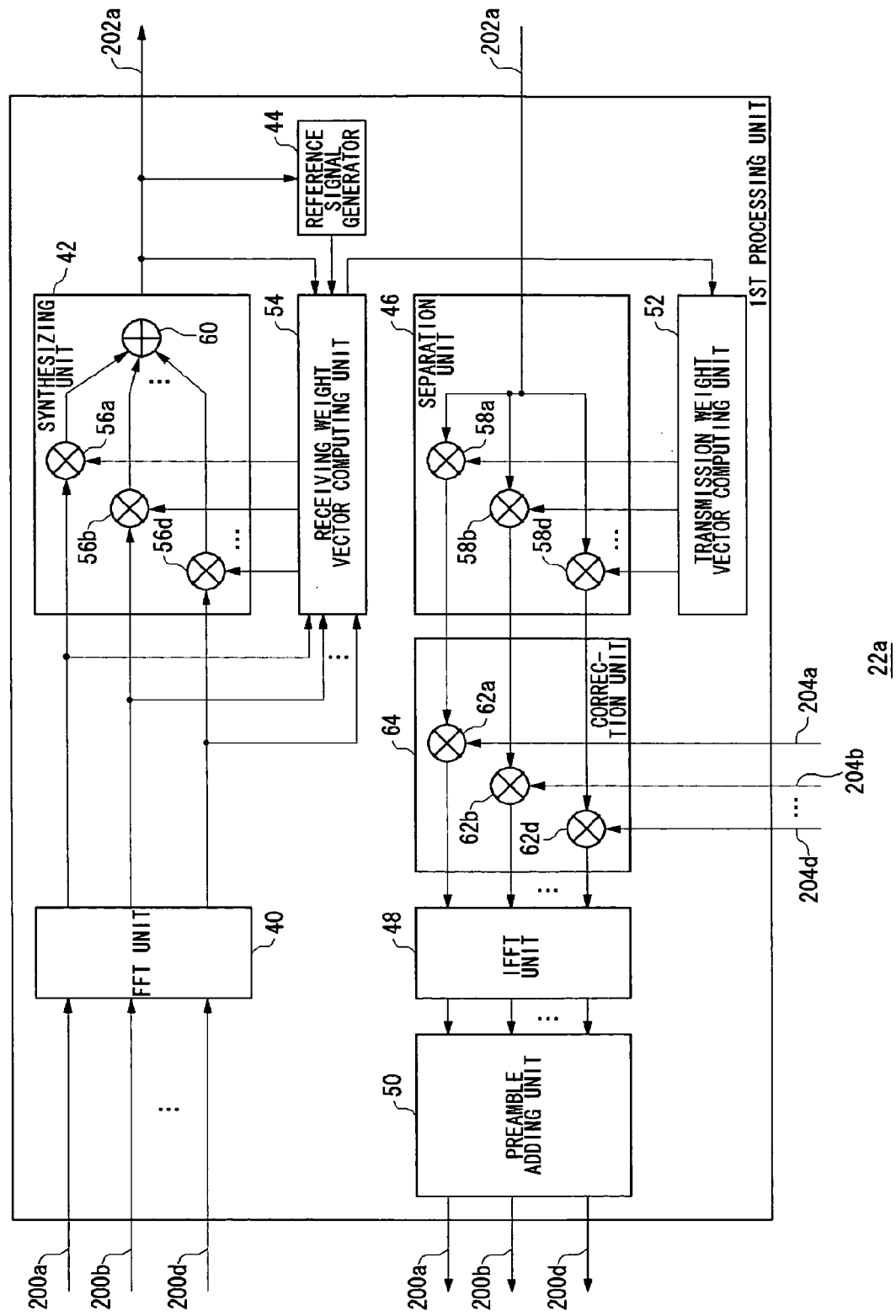
FIG. 7 illustrates a structure of the first processing unit shown in FIG. 4.

FIG. 7 illustrates a structure of a first processing unit 22a. The first processing unit 22a includes an FFT (Fast Fourier Transform) unit 40, a synthesis unit 42, a reference signal generator 44, a receiving weight vector computing unit 54, a separation unit 46, a transmission weight vector computing unit 52, an IFFT unit 48, a preamble adding unit 50 and a correction unit 64. The synthesis unit 42 includes a first multiplier 56a, a second multiplier 56b, ... and a fourth multiplier 56d, which are generically referred to as "multiplier 56", and an adder 60. The separation unit 46 includes a first multiplier 58a, a second multiplier 58b, . . . and a fourth multiplier 58d, which are generically referred to as "multiplier 58". The correction unit 64 includes a first multiplier 62a, a second multiplier 62b, . . . and a fourth multiplier 62d, which are generically referred to as "multiplier 62". The signals involved here include a first correction-value signal 204a, a second correction-value signal 204b, . . . and a fourth correction-value signal 204d, which are generically referred to as "correction-value signal 204.

The FFT unit 40 inputs a plurality of time-domain signals 200 and performs Fast Fourier Transform on them, respectively, so as to derive frequency-domain signals. As described earlier, one frequency-domain signal is such that signals corresponding to subcarriers are arranged serially in the order of the subcarrier numbers.

The multiplier 56 weights the frequency-domain signal with a receiving weight vector outputted from the receiving weight vector computing unit 54, and the adder 60 adds up the outputs from the multipliers 56. Since the frequency-domain signals are arranged in the order of the subcarrier numbers, the receiving weight vectors outputted from the receiving weight vector computing unit 54 are arranged in such a manner as to correspond thereto, too. That is, one multiplier 56 inputs successively the receiving weight vectors arranged in the order of the subcarrier numbers. Thus, the adder adds up a multiplication result on a subcarrier-by-subcarier basis. As a result, the added-up signal is also arranged serially in the order of the subcarrier numbers as shown in FIG. 5. The thus added signal is the aforementioned frequency-domain signal 202.

In the following explanation, if the signal to be processed corresponds to the frequency-domain, the processing therefor is basically executed subcarrier by subcarrier, too. For the brevity of explanation, the processing for one subcarrier will be described herein. Hence, the processing for a plurality of subcarriers will be accommodated in a manner such that the processing for a single subcarrier is executed in parallel or serially.

During the period of "Legacy STS", "Legacy LTS", "First MIMO-STS" and "First MIMO-LTS", the reference signal generator 44 outputs, as reference signals, "Legacy STS", "Legacy LTS", "First MIMO-STS" and "First MIMO-LTS" which have been stored beforehand. During the period other than these periods, the frequency-domain signal 202 is determined by a predefined threshold value, and its result is outputted as a reference signal. The determination may be a soft decision instead of the hard decision.

The receiving weight vector computing unit 54 derives receiving weight vectors, based on the frequency-domain signals outputted from the FFT unit 40, frequency-domain signals 202 and the reference signal. A method for deriving the receiving weight vectors may be arbitrary. One such a method is the derivation by an LMS (Least Mean Square) algorithm. The receiving weight vectors may be derived by a correlation processing. When a correlation processing is carried out, the frequency-domain signal and the reference signal will be inputted not only from the first processing unit 22a but also from the second processing unit 22b and the like via a signal line not shown. If a frequency-domain signal in the first processing unit 22a is denoted by $x_1(t)$, a frequency-domain signal in the second processing unit 22b by $x_2(t)$, a reference signal in the first processing unit 22a by $S_1(t)$ and a reference signal in the second processing unit 22b by $S_2(t)$, then $x_1(t)$ and $x_2(t)$ will be expressed by the following Equation (8):

$$x_1(t) = h_{11}S_1(t) + h_{21}S_2(t) \tag{8}$$
$$x_2(t) = h_{12}S_1(t) + h_{22}S_2(t)$$

It is assumed here that the number of antennas 12 and the number of antennas 14 are "2" each. The noise is ignored here. A first correlation matrix $R_1$, with E as an ensemble average, is expressed by the following Equation (9):

$$R_1 = \begin{bmatrix} E[x_1 S_1^*] & E[x_1 S_2^*] \\ E[x_2 S_1^*] & E[x_2 S_2^*] \end{bmatrix} \tag{9}$$

A second correlation matrix $R_2$ among the reference signals is given by the following Equation (10):

$$R_2 = \begin{bmatrix} E[S_1 S_1^*] & E[S_1 S_2^*] \\ E[S_2 S_1^*] & E[S_2 S_2^*] \end{bmatrix} \tag{10}$$

Finally, the first correlation matrix $R_1$ is multiplied by the inverse matrix of the second correlation matrix $R_2$ so as to derive a receiving response vector, which is expressed by the following Equation (11):

$$\begin{bmatrix} h_{11} & h_{21} \\ h_{12} & h_{22} \end{bmatrix} = R_1 R_2^{-1} \tag{11}$$

Then the receiving weight vector computing unit 54 computes a receiving weight vector from the receiving response vector. At the time of performing the aforementioned calibration, the derived receiving response vector is used as a general channel characteristic. In what is to follow, the "general channel characteristic" and the "channel characteristic" will be used in such a manner that no distinction is made therebetween, and they will be simply referred to as "channel characteristic".

The transmission weight vector computing unit 52 estimates the transmission weight vectors necessary for weighting the frequency-domain signals 202, from the receiving weight vectors. The method for estimating the transmission weight vectors is arbitrary. As a most simple method therefor, however, the receiving weight vector may be used intact. As another method, the receiving weight vector may be corrected using a conventional technique in view of the Doppler frequency shift of a propagation environment caused by time difference in between a receiving processing and a transmission processing. Here, it is assumed that the receiving weight vectors are used, directly and without modification, as the transmission weight vectors.

The multipliers 58 weight the frequency-domain signals 202 with the transmission weight vectors. The multipliers 62 multiply the multiplication result of the multipliers 58 by the correction-value signals 204. As described above, the number of multiplications by the multipliers 58 as well as the number of correction-value signals 204 is equal to the number of antennas 12. Accordingly, the multipliers 62 do multiplications in a manner such that the multiplication result of the multipliers 58 and the correction-value signals 204 are associated with each other. For example, the first multiplier 62a multiplies the multiplication result of the first multiplier 58a by the first correction-value signal 204a. Then the IFFT unit 48 performs inverse Fast Fourier Transform on the signals outputted from the multipliers 62 so as to convert them into time-domain signals. As shown in FIGS. 3A and 3B, the preamble adding unit 50 adds preambles in a header portion of burst signal. Here, "Legacy STS", "Legacy LTS", "First MIMO-STS" and "First MIMO-LTS" are added. The preamble adding unit 50 outputs, as time-domain signals 200, the signals where the preamble has been added. The above-described operation is controlled by the control unit 30 shown in FIG. 4. In FIG. 7, the first time-domain signal 200a and the like appear twice. However, these are the signal in one direction and these correspond to the first time-domain signal 200a and the like which are two-way signals as shown in FIG. 4.

Figure 8:
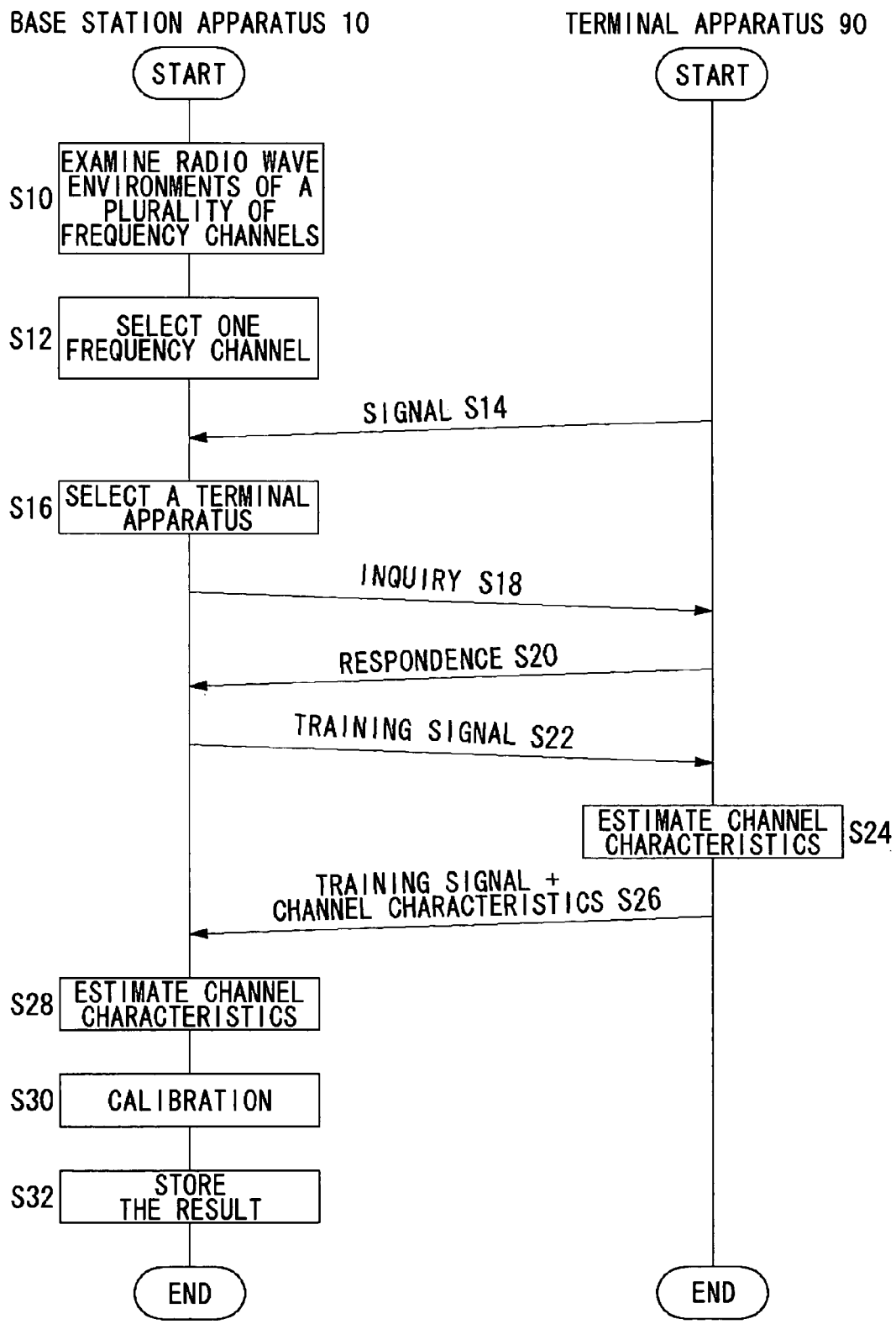
FIG. 8 is a sequence diagram showing a procedure of calibration in the communication system of FIG. 2.

An operation of a communication system 100 structured as above will now be described. FIG. 8 is a sequence diagram showing a procedure of calibration in the communication system 100. The base station apparatus 10 examines the radio wave environment of a plurality of channels (S10). The base station apparatus 10 selects one frequency channel (S12). The terminal apparatus 90 transmits signals (S14). Note that a plurality of terminal apparatuses transmit signals here. It is assumed here that a plurality of terminal apparatuses 90 have already received a beacon sent from the base station apparatus 10. The base station apparatus 10 selects one of the plurality of terminal apparatuses 90 (S16). The base station apparatus 10 transmits an inquiry to the selected terminal apparatus 90 (S18). The inquiry corresponds to a signal with which to determine if the selected terminal apparatus can be used for calibration.

The terminal apparatus 90 responds to the inquiry (S20). If the terminal apparatus 90 does not agree with the inquiry, the terminal apparatus 90 does not need to send a response. The base station apparatus 10 transmits a training signal to the terminal apparatus 90 (S22). The terminal apparatus 90 estimates a channel characteristic, based on the training signal (S24). The terminal apparatus 90 transmits the training signal and at the same time transmits to the base station apparatus 10 the estimated channel characteristic as data (S26). The base station apparatus 10 estimates a channel characteristic, based on the training signal (S28). While using the estimated channel characteristic and the channel characteristic received from the terminal apparatus 90, the base station apparatus 10 carries out calibration (S30). The base station apparatus 10 stores the result of calibration (S32). The base station apparatus 10 uses the result of calibration for communications.

Figure 9:
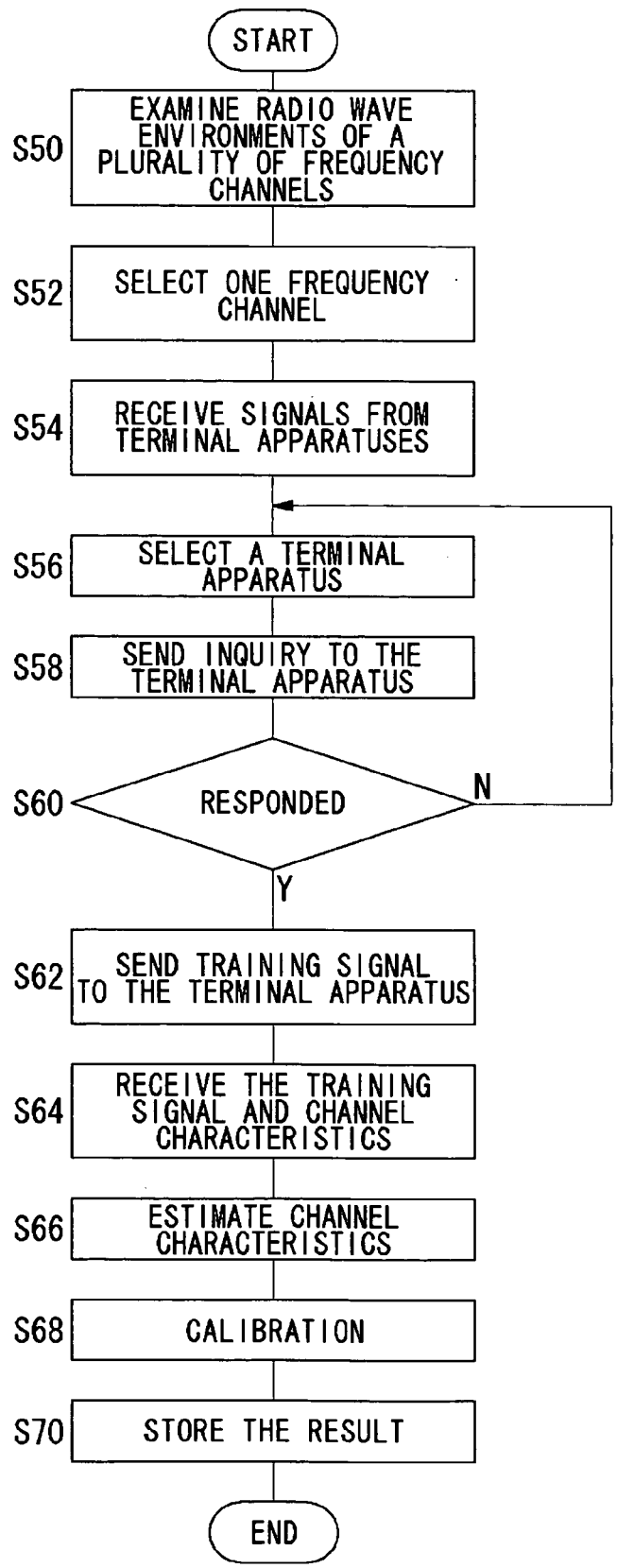
FIG. 9 is a flowchart showing a procedure of calibration in the base station apparatus of FIG. 2.

FIG. 9 is a flowchart showing a procedure of calibration in the base station apparatus 10. The examining unit 70 examines the radio wave environment of a plurality of channels (S50). The examining unit 70 selects one frequency channel, based on the result of examination (S52). The radio units 20 and so forth receive signals from a plurality of terminal apparatuses (S54). The execution unit 74 selects one terminal apparatus 90 (S56). The radio units 20 and so forth transmit an inquiry to the selected terminal apparatus 90 (S58). If there is no response from the terminal apparatus 90 (N of S60), the execution unit 74 executes the repeated processing of Step S56. If there is a response from the terminal apparatus 90 (Y of S60), the radio units 20 and so forth transmit training signals (S62). The radio units 20 and so forth receive the training signal from the terminal apparatus 90 and at the same time receive the estimated channel characteristic as data (S64). The processing unit 22 estimates the channel characteristic (S66). The execution unit 74 carries out calibration (S68). The storage unit 76 stores the result of calibration (S70). The setting unit 78 sets, as a correction-value signal 204, the result of calibration to the processing unit 22.

According to the present embodiments, the calibration is performed using one frequency channel selected as a result of a channel search, so that a frequency channel suitable for calibration can be selected from among a plurality of frequency channels. Since the calibration is executed after the frequency channel suitable for calibration has been selected, the error contained in a calibration result can be reduced. Since a frequency channel whose signal strength is smaller is selected, the frequency channel having little effect on the other signals can be used for the calibration. Since having little effect on the other signals is equivalent to having little effect caused by interference, the error, contained in a calibration result, due to interference can be reduced. Furthermore, the signal strength is measured in the channel search and a function necessary for measuring the signal strength is provided beforehand, so that the increase in circuit scale can be prevented.

Since a terminal apparatus usable for calibration is selected from among a plurality of terminal apparatuses, the terminal apparatus suitable for calibration can be selected and the error contained in a calibration result can be reduced. Since a channel search for a plurality of frequency channels is conducted in advance, a calibration processing can be automated once a base station apparatus is started up. Since the calibration processing is automated, the calibration processing can be executed arbitrarily. Since the calibration is executed arbitrarily and appropriately, the degradation of communications can be prevented. Since it is only necessary to store the calibration result on one frequency channel, the storage capacity can be made smaller.

Much more specific explanation will be offered as follows. It is normally required that correction values for calibration be stored for each frequency channel per carrier frequency thereof. According to the present embodiments, however, calibration is automatically executed with timing when the frequency timing is changed, and stores the correction values in different frequency channels by overwriting them, so that the storage capacity can be made smaller.

The present invention has been described based on the embodiments which are only exemplary. It is therefore understood by those skilled in the art that other various modifications to the combination of each component and process described above are possible and that such modifications are also within the scope of the present invention.

In the present embodiments, the examining unit 70 measures RSSIs when it examines the radio wave environment. However, the prevent invention is not limited thereto and, for example, the examining unit 70 may measure a cross-correlation between a received signal and the signal stored beforehand, an autocorrelation between a component of the transmitted signal in the received signal and the signal stored beforehand, and a noise floor and then compare the measurement result with threshold values so as to select one frequency channel. Also, the examining unit 70 may use the identification numbers of the terminal apparatus 90 or the base station apparatus 10 that use a plurality of frequency channels, and then select a frequency channel that has a smaller number. According to this modification, the radio wave environment of a radio channel can be measured by using a various types of methods. That is, it suffices as long as a frequency channel suitable for calibration is selected.

In the present embodiments, the description has been given on the assumption that the communication system 100 uses the OFDM modulation scheme. However, the present invention is not limited thereto, and the communication system 100 may use a single-carrier method. According to this modification, the present invention can be applied to various kinds of communication systems. That is, it suffices as long as a communication system which performs beamforming by a plurality of antennas is used.

The calibration processing in the base station apparatus 10 has been explained in the present embodiments. However, the present invention is not limited thereto, and the calibration processing may be carried out in the terminal apparatus 90. If this is the case, the terminal apparatus 90 will have a structure similar to that of FIG. 4. In this case, however, the examining unit 70 examines a base station apparatus 10 or base station apparatuses 10 located in the vicinity of the terminal apparatus 90. The selector 72 selects a base station apparatus 10 that uses any of a plurality of frequency channels usable for communications. The selection may be carried out based on the signal strength. The execution unit 74 transmits from a plurality of antennas 14 the signals to be sent to one base station apparatus 10 selected by the selector 72, and receives the signals sent from the selected base station apparatus 10 by the plurality of antennas 14 so as to execute calibration for the plurality of antennas 14. The calibration processing and the like therefor are the same as those described in the above embodiments and hence the repeated explanation is omitted here. According to this modification, a base station apparatus 10, which uses any of a plurality of frequency channels, is selected, so that the calibration can be conducted.

Taking both the present embodiments and the above modifications into consideration, the present invention can be applied to a general radio apparatus. In such a case, the selector 72 selects one frequency channel to be used for communications, among a plurality of frequency channels usable for communications. The execution unit 74 transmits from a plurality of antennas the signals to be sent to a predetermined radio apparatus while using one frequency channel selected by the selector 72, and receives the signals sent from the predetermined radio apparatus by the plurality of antennas so as to execute calibration for a plurality of antennas. The operation may be the same as that of the base station apparatus 10 described in the present embodiments. The examining unit 70 checks the radio wave environment on at least one of a plurality of frequencies usable for communications. The selector 72 selects one frequency channel to be used for communications, based on the search result by the examining unit 70. The execution unit 74 transmits from a plurality of antennas the signals to be sent to other radio apparatuses while using one frequency channel selected by the selector 72, and receives the signals sent from the other radio apparatuses by the plurality of antennas so as to execute calibration for a plurality of antennas. The structure for these components may be realized by incorporating and combining optionally the contents described in the present embodiments. Such a radio apparatus as described in this modification is used in, for example, an ad-hoc network. According to this modification, calibration is performed after one frequency channel to be used for communications has been selected from among a plurality of frequency channels, so that a frequency channel suitable for calibration can be selected from among a plurality of frequency channels and therefore the error contained in a calibration result can be reduced.

According to the present embodiments, the execution unit 74 selects, as the terminal apparatus 90 usable for calibration, a terminal apparatus 90 whose signal strength becomes maximum. However, the selection scheme is not limited thereto, and the execution unit 74 may derive a quality of the received signal and the derived quality of signal may be used in the selection of a terminal apparatus 90. For instance, the execution unit 74 checks on a quality of signals sent from the terminal apparatuses 90 for a certain fixed period and then selects a terminal apparatus 90 that corresponds to the signal of the highest quality. The fixed period may be defined in terms of time or may be an instance when the number of terminal apparatuses 90 hits a certain value. That the quality is high corresponds to cases where the signal strength is high, SINR is highest, EVM is small and the like. Accordingly, the execution unit 74 measures at least one of these. As another example, a threshold value is set beforehand for the quality and if a terminal apparatus 90 whose quality is higher than the threshold value is detected, the execution unit 74 will select the terminal apparatus 90. As for the quality, that the quality is high corresponds to cases where the signal strength is high, SINR is highest, EVM is small and the like, as mentioned above. As still another example, the quality of a signal for the terminal apparatus 90 which once underwent the calibration is stored and if a terminal apparatus 90 which has a higher quality than that of said signal is detected, said terminal apparatus 90 will be selected again. In such a case, the calibration may be conducted again. According to this modification, a terminal apparatus can be selected such that the error contained in a calibration result is reduced.

According to the present embodiments, the storage unit 76 stores the calibration performed on one frequency channel. However, the present invention is not limited thereto and, for example, the storage unit 76 may store, in an associated manner, a calibration result in one frequency channel and the number used to identify the frequency channel used for the calibration. In so doing, the execution unit 74 may refer to the calibration result and the number used to identify the frequency channel stored in the storage unit 76 at the time of executing a calibration from the next time on. That is, if the communication is held under the same frequency channel, the execution unit 74 can skip the operation of calibration by using the calibration result thus stored. Alternatively, the execution unit 74 sets the stored calibration result to an initial value, so that the operation of calibration can be shortened. According to this modification, the calibration result can be derived in a simplified manner.

According to the present embodiments, the execution unit 74 selects a terminal apparatus 90 in response to the signal strength. However, the present invention is not limited thereto and, for example, the execution unit 74 may select a terminal apparatus 90 in the light of CSMA/CA. The base station apparatus 10 receives signals by varying the channel so as to receive beacons sent from the other base station apparatuses 10 or probe requests and data sent from the terminal apparatuses 90. Based on these, the base station apparatus 10 grasps the usage status of said channel. For example, the base station apparatus 10 selects a channel which is not frequently used. As a result, the base station can select channels which are not frequently used. On the other hand, the terminal apparatus 90 checks on the usage status of surrounding base station apparatuses 10, based on the probe requests. The terminal apparatus 90 may inform the base station apparatus 10 about the result of such checking.

While the preferred embodiments of the present invention have been described using specific terms, such description is for illustrative purposes only, and it is to be understood that changes and variations may be made without departing from the spirit or scope of the appended claims.

What is claimed is:

1. A base station apparatus, comprising:
   an examining unit which examines a radio wave environment on at least one of a plurality of frequency channels usable for communications;

a selector which selects one frequency channel to be used for communications, based on an examination result by said examining unit;

an execution unit which transmits signals from a plurality of antennas to a terminal apparatus using the one frequency channel selected by said selector and which performs calibration on the plurality of antennas by receiving signals from the terminal apparatus by the plurality of antennas; and a storage unit which stores, in an associated manner, a result of calibration, executed in said execution unit, in the one frequency channel selected by said selector and a number to identify a frequency channel used for calibration, wherein the signal from the terminal apparatus received by the execution unit includes a first known signal for automatic gain control (AGC) estimation provided in at least one of a plurality of streams, a second known signal for channel estimation provided posterior to the first known signal in a plurality of streams, and data provided posterior to the second known signal in the same stream as the first known signal, the number of streams provided with the data is smaller than the number of streams provided with the second known signal, and at the time of execution of calibration said execution unit refers to the result of calibration and the number to identify a frequency channel, which are stored in said storage unit.

2. A base station apparatus according to claim 1, further comprising a receiver which receives signals from a plurality of terminal apparatuses, wherein, based on the signals received by said receiver, said execution unit selects from the plurality of terminal apparatuses a terminal apparatus usable for calibration.

3. A base station apparatus according to claim 2, wherein said execution unit derives a quality of signals received by said receiver and utilizes the derived quality for selecting the terminal apparatus.

4. A radio apparatus, comprising:

a selector which selects, from a plurality of frequency channels usable for communications, one frequency channel to be used for communications;

an execution unit which transmits signals from a plurality of antennas to a predetermined radio apparatus using the one frequency channel selected by said selector and which performs calibration on the plurality of antennas by receiving signals from the predetermined radio apparatus by the plurality of antennas; and a storage unit which stores, in an associated manner, a result of calibration, executed in said execution unit, in the one frequency channel selected by said selector and a number to identify a frequency channel used for calibration, wherein the signal from the predetermined radio apparatus received by the execution unit includes a first known signal for automatic gain control (AGC) estimation provided in at least one of a plurality of streams, a second known signal for channel estimation provided posterior to the first known signal in a plurality of streams, and data provided posterior to the second known signal in the same stream as the first known signal, the number of streams provided with the data is smaller than the number of streams provided with the second known signal, and at the time of execution of calibration said execution unit refers to the result of calibration and the number to identify a frequency channel, which are stored in said storage unit.

5. A radio apparatus, comprising:

an examining unit which examines a radio wave environment on at least one of a plurality of frequency channels usable for communications;

a selector which selects one frequency channel to be used for communications, based on an examination result by said examining unit;

an execution unit which transmits signals from a plurality of antennas to another radio apparatus using the one frequency channel selected by said selector and which performs calibration on the plurality of antennas by receiving signals from the another radio apparatus by the plurality of antennas; and a storage unit which stores, in an associated manner, a result of calibration, executed in said execution unit, in the one frequency channel selected by said selector and a number to identify a frequency channel used for calibration, wherein the signal from the another radio apparatus received by the execution unit includes a first known signal for automatic gain control (AGC) estimation provided in at least one of a plurality of streams, a second known signal for channel estimation provided posterior to the first known signal in a plurality of streams, and data provided posterior to the second known signal in the same stream as the first known signal, the number of streams provided with the data is smaller than the number of streams provided with the second known signal, and at the time of execution of calibration said execution unit refers to the result of calibration and the number to identify a frequency channel, which are stored in said storage unit.

6. A calibration method, comprising:

selecting, from a plurality of frequency channels usable for communications, one frequency channel to be used for communications;

transmitting signals from a plurality of antennas to a predetermined radio apparatus using the one frequency channel selected by said selecting and performing calibration on the plurality of antennas by receiving signals from the predetermined radio apparatus by the plurality of antennas; and storing in a memory, in an associated manner, a result of calibration, executed in said transmitting and performing calibration, in the one frequency channel selected by said selecting and a number to identify a frequency channel used for calibration, wherein the signal received in the receiving from the radio apparatus includes a first known signal for automatic gain control (AGC) estimation provided in at least one of a plurality of streams, a second known signal for channel estimation provided posterior to the first known signal in a plurality of streams, and data provided posterior to the second known signal in the same stream as the first known signal, the number of streams provided with the data is smaller than the number of streams provided with the second known signal, and at the time of performing calibration said transmitting and performing calibration is such that the result of calibration and the number to identify a frequency channel, which are stored in the memory, are referred to.

7. A calibration method according to claim 6, further comprising receiving signals from a plurality of radio apparatuses, wherein, based on the signals received by said receiving, said transmitting and performing calibration is such that a radio apparatus usable for calibration is selected from the plurality of radio apparatuses.

8. A calibration method according to claim 7, wherein said transmitting and performing calibration is such that a quality of signals received by said receiving is derived and the derived quality is utilized for selecting the radio apparatus.

9. A radio system, comprising:

an examining unit which examines a radio wave environment on at least one of a plurality of frequency channels usable for communications;

a selector which selects one frequency channel to be used for communications, based on an examination result by said examining unit;

a first execution unit which transmits signals from a first plurality of antennas to a terminal apparatus using the one frequency channel selected by said selector and which performs calibration on the first plurality of antennas by receiving signals from the terminal apparatus by the first plurality of antennas;

a storage unit which stores, in an associated manner, a result of calibration, executed in said first execution unit, in the one frequency channel selected by said selector and a number to identify a frequency channel used for calibration;

a selector which selects a base station apparatus that uses any of a plurality of channels usable for communications; and a second execution unit which transmits signals from a second plurality of antennas to the base station apparatus selected by said selector and which performs calibration on the second plurality of antennas by receiving signals from the selected base station apparatus by the second plurality of antennas, wherein the signal from the terminal apparatus received by the first execution unit includes a first known signal for automatic gain control (AGC) estimation provided in at least one of a plurality of streams, a second known signal for channel estimation provided posterior to the first known signal in a plurality of streams, and first data provided posterior to the second known signal in the same stream as the first known signal, the number of streams provided with the first data is smaller than the number of streams provided with the second known signal, at the time of execution of calibration said first execution unit refers to the result of calibration and the number to identify a frequency channel, which are stored in said storage unit, the signal from the base station apparatus received by the second execution unit includes a third known signal for AGC estimation provided in at least one of a plurality of streams, a fourth known signal for channel estimation provided posterior to the first known signal in a plurality of streams, and data provided posterior to the fourth known signal in the same stream as the third known signal, and the number of streams provided with the second data is smaller than the number of streams provided with the fourth known signal.

* * * * *